J. F. WITHROW.
FEED RACK.
APPLICATION FILED MAY 23, 1908.

914,001.  Patented Mar. 2, 1909.

WITNESSES:
William Bell.
Ma Schmidt

INVENTOR
J. F Withrow.
BY Milo B. Stevens
Attorneys

UNITED STATES PATENT OFFICE.

JOHN F. WITHROW, OF ENGLEWOOD, KANSAS.

FEED-RACK.

No. 914,001.      Specification of Letters Patent.      Patented March 2, 1909.

Application filed May 23, 1908. Serial No. 434,691.

*To all whom it may concern:*

Be it known that I, JOHN F. WITHROW, a citizen of the United States, residing at Englewood, in the county of Clark and State of Kansas, have invented certain new and useful Improvements in Feed-Racks, of which the following is a specification.

This invention relates to feed-racks, and has for its object to provide an improved rack in which the feed is supplied to the stock in small quantities in order to prevent choking and bolting, and also to effect a saving of feed.

The invention is illustrated in the accompanying drawing in which—

Figure 1:
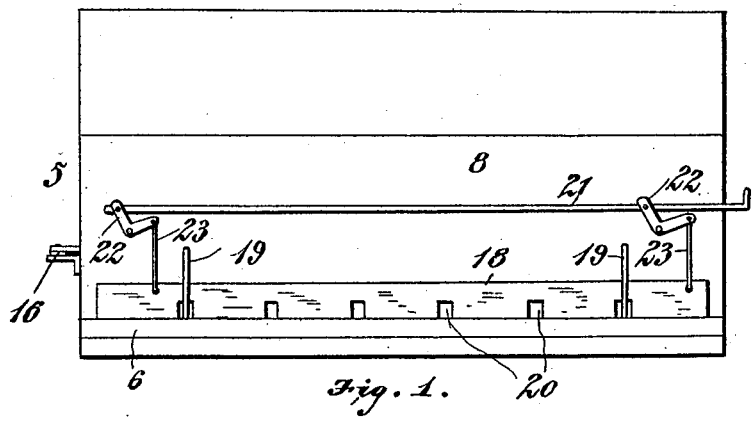
Figure 2:
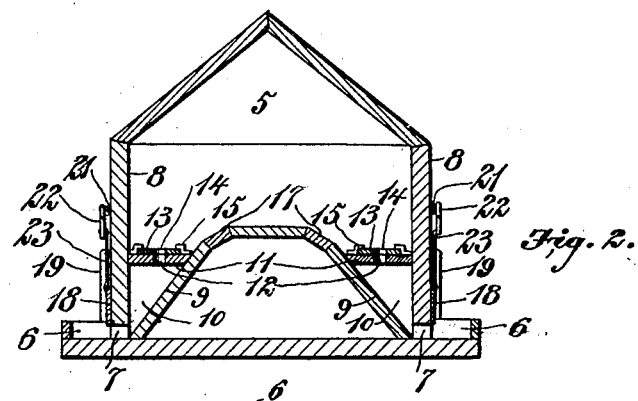
Figure 3:
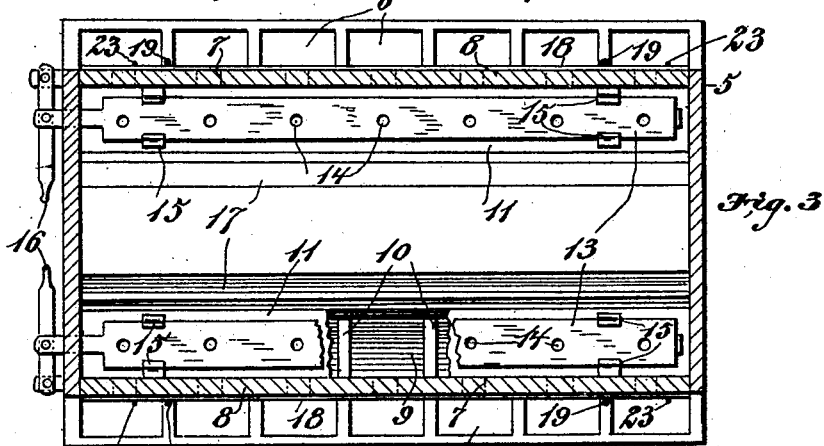

Figure 1 is an elevation thereof. Fig. 2 is a cross section. Fig. 3 is a horizontal section parts being shown broken away.

Referring specifically to the drawing, 5 denotes a bin in which the feed is stored. On the outside of the bin are feed-troughs 6 which are located on both sides of the bin and extend the entire length thereof. Each trough communicates with the interior of the bin by an opening 7 in the side-walls 8 thereof.

The floor of the bin, adjacent each side-wall 8, is made inclined as indicated at 9, and between said inclined portions and the side-walls is a series of partitions 10 which are spaced apart uniformly to form a series of hoppers for delivering the feed to the troughs, the feed passing from the hoppers into the troughs through the openings 7. The hoppers are provided with a cover 11 having openings 12, one of such openings being provided for each hopper. On top of the covers 11 are mounted slides 13 which are adapted to cover and uncover the openings 12, the slides having openings 14 corresponding to the openings 12. When the openings 12 and 14 register the feed can flow from the bin into the hopper, and when the openings 12 are covered by the imperforate portions of the slides the flow of feed to the hopper is shut off. The slides work under guides 15 on the cover 11, and they extend through slots in one of the end walls of the bin, and on the outside thereof they are connected to an operating lever 16. The floor of the bin is also inclined toward the covers of the hoppers as indicated at 17 in order that the feed may flow toward the same.

On the outside of the side-walls of the bin are mounted slides 18 for controlling the openings 7. Said slides are strips extending the entire length of the rows of troughs, and work up and down under guides 19 secured to the side-walls. The strips have recesses 20 into which the side-walls of the troughs extend when the strips are lowered to cover the openings 7. The strips are operated to cover and uncover the openings 7 by rod 21 connected to one arm of bell-crank levers 22 fulcrumed on the side-walls of the bin, the other arm of the levers being connected by links 23 to the strips.

By the apparatus herein described there is a saving of feed, and as it is delivered to the troughs in small quantities bolting and choking is prevented. The slides 13 readily control the supply of feed to the troughs, and by the slides 18 the supply of feed to all the troughs on either side of the bin can be shut off simultaneously. The apparatus is simple in construction, it has no complicated parts, and can be readily and cheaply built.

I claim:

A feed rack comprising a bin having in its side wall a series of valved openings and a floor inclined toward said openings, vertical partitions between the inclined portion of the floor and the side wall to form a series of hoppers, a cover over the hoppers, resting on the partitions and extending between the inclined floor and the side wall and having an opening for each hopper, a perforated slide on the cover for controlling said openings, and troughs on the outside of the bin, communicating with the hoppers by the said openings in the side wall.

In testimony whereof I affix my signature, in presence of two witnesses.

JOHN F. WITHROW.

Witnesses:
   J. R. McCASTER,
   M. H. POPP.